United States Patent [19]

Wilhelm

[11] 4,328,822
[45] May 11, 1982

[54] BREAKAWAY COUPLING ASSEMBLY

[75] Inventor: Raymond L. Wilhelm, Trabuco Canyon, Calif.

[73] Assignee: Brunswick Corporation, Skokie, Ill.

[21] Appl. No.: 112,166

[22] Filed: Jan. 15, 1980

[51] Int. Cl.³ ............................................. F16K 13/04
[52] U.S. Cl. ................................ 137/68 R; 137/599.2; 285/2
[58] Field of Search .................. 137/68 R, 599, 599.2; 285/2, 3

[56] References Cited

U.S. PATENT DOCUMENTS

| | | | |
|---|---|---|---|
| 3,065,950 | 11/1962 | Goldberg | 137/68 R X |
| 3,219,047 | 11/1965 | Kircher | 137/68 R |
| 3,921,656 | 11/1975 | Meisenheimer | 137/68 R |
| 4,090,524 | 5/1978 | Allread | 137/68 R |

*Primary Examiner*—Harold W. Weakley
*Attorney, Agent, or Firm*—L. David Rish; William G. Lawler, Jr.

[57] ABSTRACT

A breakaway valve fitting includes a housing which defines a passage therein and a breakaway assembly connecting the housing to a conduit. The breakaway valve fitting further includes a poppet valve element mounted for axial movement within the housing between open and closed positions, the poppet valve element defining a first axial fluid flow path about the perimeter thereof when in the open position. A first valve seat is defined in the housing passage and cooperates with the poppet valve element when in its closed position to obstruct the first fluid flow path. The breakaway valve fitting further includes a rotatable valve element mounted for axial and rotational movement within the housing between open and closed positions. The rotatable valve element includes a central bore which defines in conjunction with the poppet valve element a second axial fluid flow path when the rotatable valve element is in its open position. A second valve seat is also defined in the housing passage and cooperates with the rotatable valve element when in its closed position to obstruct the second fluid flow path. A mechanism is provided for interconnecting the poppet valve element and the rotatable valve element for permitting simultaneous axial and rotational movement of the rotatable valve element relative to the poppet valve element when moving from the open to the closed positions to thereby engage the rotatable valve element against the second valve seat and obstruct the second fluid flow path. A mechanism is also provided for releasably retaining the rotatable valve element in its open position, and a device is provided for biasing the poppet valve element and the rotatable valve element, respectively, toward the first and second valve seats. Finally, a valve operating assembly is provided for sensing the connection of the housing to the conduit and controlling the operation of the poppet valve element and the retaining device by permitting the poppet valve element to axially move to its closed position and the retaining device to release the rotatable valve element to obstruct the fluid flow paths upon activation of the breakaway assembly.

24 Claims, 9 Drawing Figures

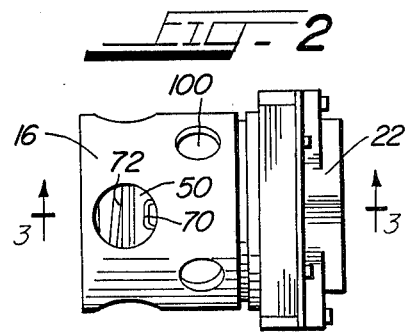
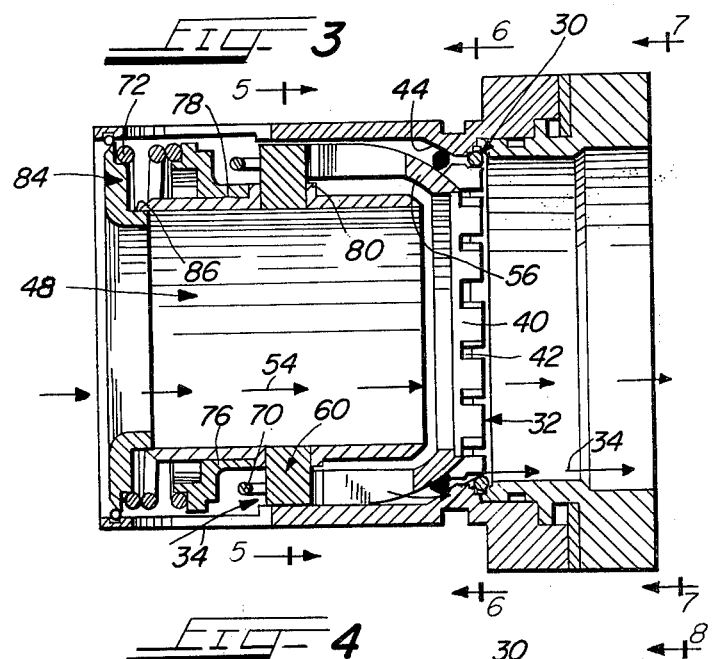
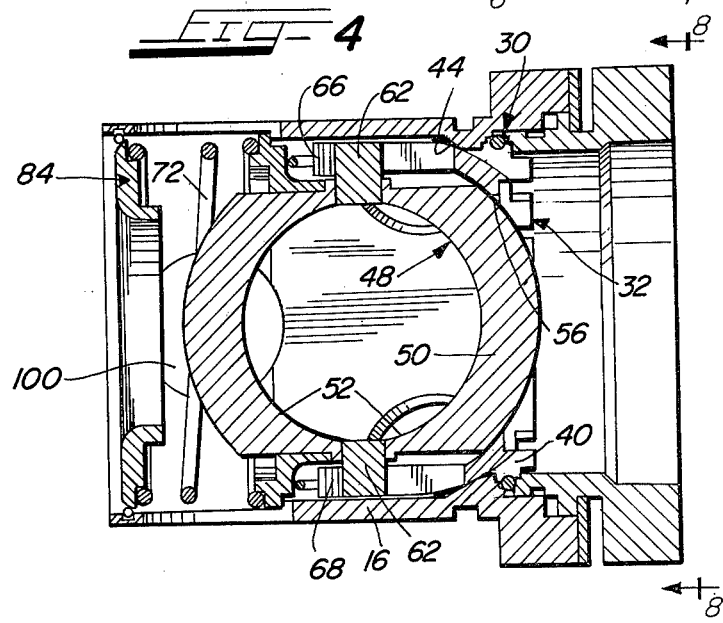

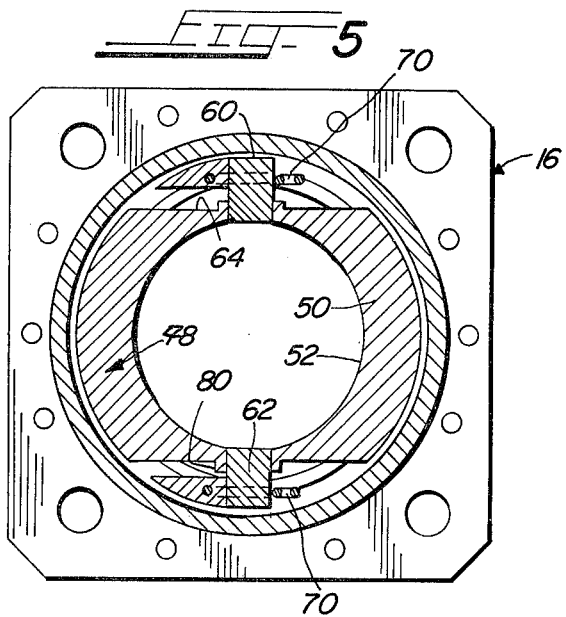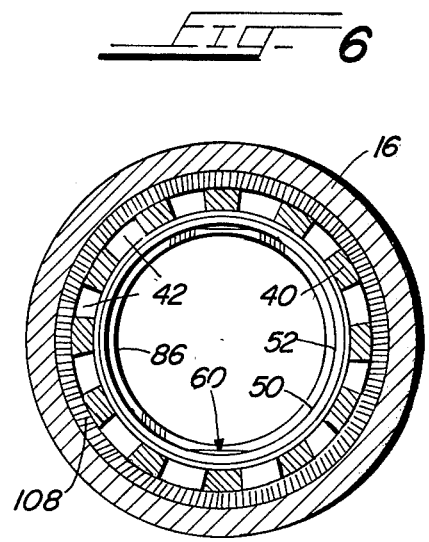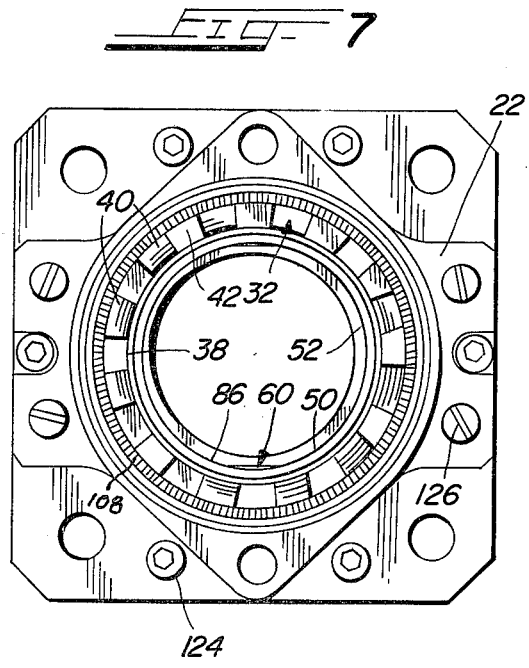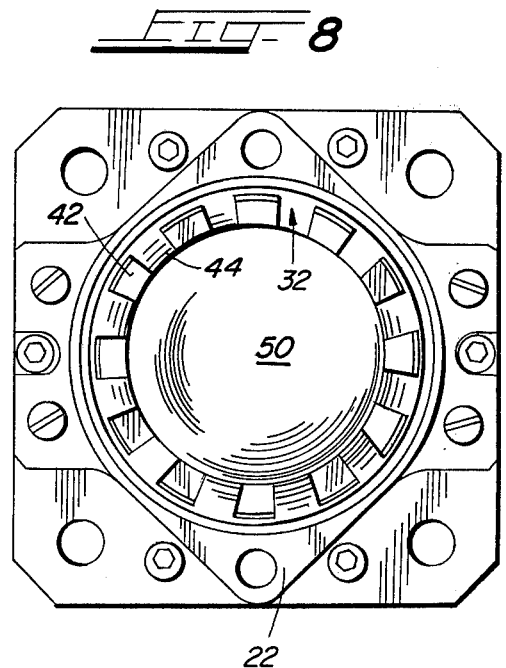

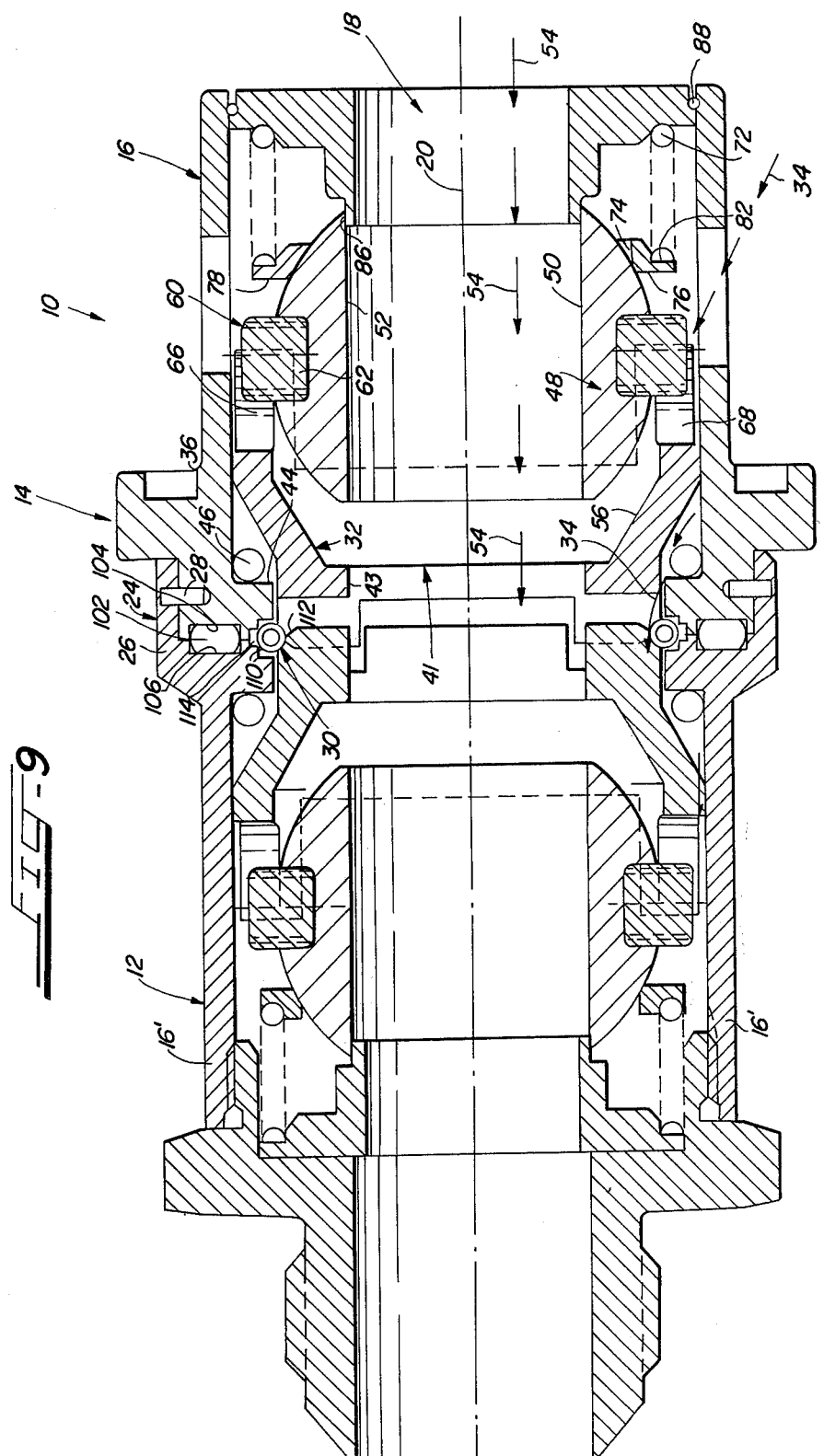

BREAKAWAY COUPLING ASSEMBLY

BACKGROUND OF THE INVENTION

1. Field of the Invention

This invention relates to breakaway coupling assemblies, and more particularly, to frangible valve fittings for such assemblies. Specifically, the present invention relates to an improved breakaway valve fitting which is self-closing and includes a frangible coupling.

2. Description of the Prior Art

In the transporting of fluids, either liquids or gases, certain applications require that the fluid conduits be capable of fracturing or separating at predetermined locations for safety purposes. Such requirements are common in the aircraft industry and in other applications wherein, in the event of an accident, collision or crash, it is desired that fuel lines and other conduits containing flammable liquids or gases separate from the tanks or reservoirs which carry such liquids or gases. This is in order to minimize the spillage of such flammable liquids and reduce fire hazards as well as improve the control of fires. Such breakaway valve fittings may be located within fuel lines themselves or at the junction of fuel lines and tanks or reservoirs, such junction points commonly being the weakest juncture in the entire fuel system, thereby representing the weakest link wherein the greatest chance of fracture would normally occur.

In the past, frangible valve fittings have been used to provide the weakest juncture point in a fuel line. In this manner, should fuel line separation occur as a result of an accident, such separation would occur at the frangible valve fitting. This valve fitting, therefore, would automatically seal the passageways of the fuel line upon fracture of the frangible members, thereby preventing the escape of fuel contained in the fuel line and the fuel tanks.

In the past, such frangible valve fittings have often utilized poppet-type valves placed within the fitting body passage. While such poppet valves are generaly capable of sealing the fitting passage, their design and construction produces relatively high resistance to flow through the passage, and may create undesirable turbulence during normal operation. In addition, known frangible valve fittings often utilize relatively close tolerances between components intended to move relative to each other during operation, and in view of the fact that long periods of time may exist between operation of the valve components of the fittings, the components may corrode or otherwise limit movement relative to each other rendering the device inoperative when needed.

U.S. Pat. No. 4,090,524 discloses a frangible valve fitting which incorporates a flapper valve with a poppet valve to insure closure movement. However, a distinct problem with flapper valves is that should pieces of the fractured frangible elements or any other debris become lodged in the valve openings prior to complete closure of the flapper portions, the valves will not close entirely. Furthermore, a large amount of movement is required to move the flapper valve member from its open position to its closed position, thereby allowing substantial amounts of fuel to leak prior to full closure of the valve.

U.S. Pat. No. 3,921,656 discloses a self-closing breakaway valve which utilizes a pair of ball valves which are rotatable upon release of a trigger device upon separation of the valve housings. While this design overcomes several of the problems associated with prior self-closing breakaway valve assemblies, this design also includes certain disadvantages. One such disadvantage is that the ball valves of this particular device do not move so as to positively close against a valve seat. Therefore, should the preload of the spring member which rotates the ball valve be reduced during the course of time, the ball valve may not be fully rotated against a high internal fuel pressure when the device eventually becomes needed. Thus, the valve would not fully close.

SUMMARY OF THE INVENTION

Therefore, it is one object of the present invention to provide an improved breakaway coupling assembly.

It is another object of the present invention to provide an improved frangible valve assembly having a high force, positive open/close design.

Yet another object of the present invention is to provide a breakaway valve fitting incorporating both poppet valve and ball valve closure mechanisms, which design permits adjustment of the fluid flow between the two closure mechanisms to accommodate specific requirements of the particular application for the fitting.

Accordingly, the present invention provides a breakaway valve fitting having a housing element defining a passage therein. A breakaway assembly is provided to connect the housing element to a conduit member. The breakaway valve fitting further includes a poppet valve element mounted for axial movement within the housing between open and closed positions, the poppet valve element defining a first axial fluid flow path about the perimeter thereof when in its open position. A first valve seat is defined in the housing passage and cooperates with the poppet valve element when in its closed position to obstruct the first fluid flow path.

The breakaway valve fitting also includes a rotatable valve element mounted for axial and rotational movement within the housing between open and closed positions. The rotatable valve element includes a central bore which defines in conjunction with the poppet element a second axial fluid flow path through the housing when the rotatable valve element is in its open position. A second valve seat is defined in the housing passage and cooperates with the rotatable valve element when in its closed position to obstruct the second fluid flow path.

A mechanism is provided for interconnecting the poppet valve element and the rotatable valve element for permitting simultaneous axial and rotational movement of the rotatable valve element relative to the poppet valve element when moving from the open to closed positions and thereby engage the rotatable valve element against the second valve seat and obstruct the second fluid flow path. A retaining mechanism is provided for releasably retaining the rotatable valve element in its open position, and an assembly is further provided for biasing the poppet valve element and the rotatable valve element, respectively, toward the first and second valve seats.

Finally, a valve operating device is provided for sensing the connection of the housing to the conduit and controlling the operation of the poppet valve element and the retaining mechanism by permitting the poppet valve element to axially move to its closed position while also permitting the retaining mechanism to release the rotatable valve element to thereby obstruct both first and second fluid flow paths upon activation of the breakaway assembly.

In one preferred embodiment of the present invention, the breakaway mechanism is in the form of a plurality of frangible elements which are adapted to fracture when a predetermined load is imposed on the valve fitting housing and conduit. Upon fracturing of these elements, the valve operating mechanism permits axial movement of the poppet valve element toward its closed position, which movement in turn permits the retaining mechanism to release the rotatable valve element. The movement of both the poppet valve element and the rotatable valve element to their closed positions obstructs both fluid flows through the housing passage and thereby seals the conduits attached to the valve fitting housing.

BRIEF DESCRIPTION OF THE DRAWINGS

The novel features which are believed to be characteristic of the present invention are set forth in the appended claims. The invention itself, however, together with further object and attendant advantages thereof, will become apparent and best understood by reference to the following detailed description taken in connection will the accompanying drawings, setting forth by way of illustration and example certain embodiments of the invention in the several figures of which like reference numerals identifying like elements, and in which:

FIG. 2 is a side elevation view of the breakaway valve fitting of FIG. 1 in its fully assembled condition;

FIG. 3 is an enlarged cross-sectional view taken substantially along line 3-3 of FIG. 2 and illustrating the valve fitting of the present invention in its open position;

FIG. 4 is the breakaway valve fitting of FIG. 3 but illustrating the fitting in its closed position;

FIG. 5 is a sectional view taken substantially along line 5—5 of FIG. 3;

FIG. 6 is a sectional view taken substantially along line 6—6 of FIG. 3;

FIG. 7 is a front plan view taken substantially along line 7—7 FIG. 3;

FIG. 8 is a front plan view taken substantially along line 8—8 of FIG. 4; and,

FIG. 9 is an axial, cross-sectional view of a frangible valve assembly constructed in accordance with the present invention and illustrating both valves thereof in their open position.

Figure 1:
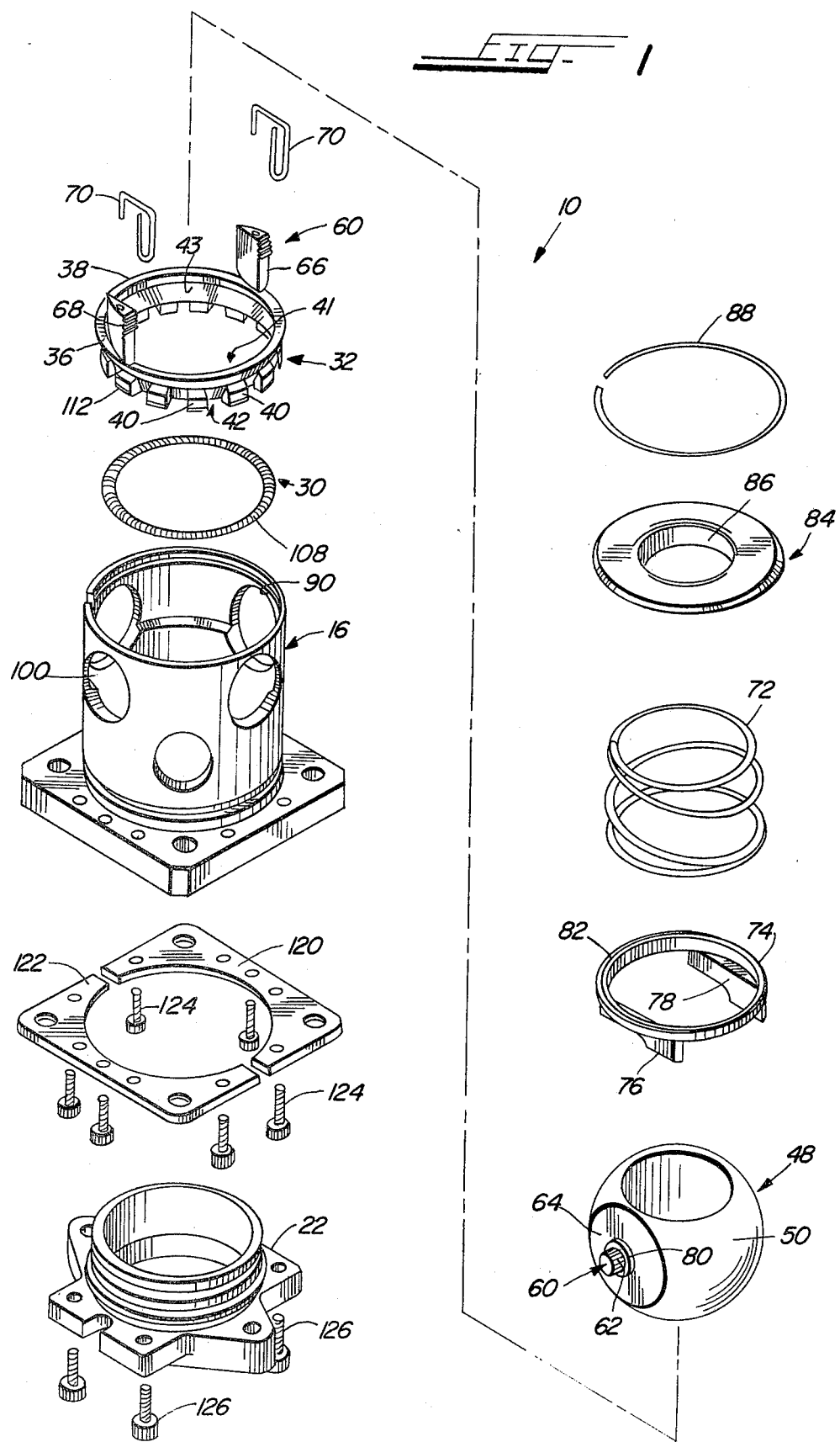
FIG. 1 is an exploded schematic view of a breakaway valve fitting constructed in accordance with the present invention and mounted in a testing fixture.

It is understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

DETAILED DESCRIPTION OF THE PREFERRED EMBODIMENTS

Referring generally to FIGS. 1 and 9, a breakaway valve fitting 10 is illustrated. In preferred form, as illustrated in FIG. 9, two substantially identical valve fittings 10 and 12 are utilized to form a valve assembly 14. For the purposes of specific illustration and explanation, one valve fitting 10 will be described in detail below. However, it will be noted that like numerals indicate like parts in valve fitting 10 and in valve fitting 12.

Each breakaway valve fitting 10 preferably includes a housing member 16 which defines an interior passage 18 therein. In preferred form, the housing 16 is in the form of a cylinder which defines a substantially tubular passage 18. For the purpose of this application and the claims, the term "axial" refers generally to the direction of the longitudinal axis 20 of the housing 16.

The housing 16 is connected to a conduit, represented for example by member 22, or another similar housing 16' by a breakaway assembly designated generally at 24. In preferred form, the breakaway assembly 24 includes a coupling member 26 having at least one frangible element 28 interconnecting the housing 16 with the conduit 22 or other housing 16'. This structure will be defined in greater detail given below.

A valve operating mechanism designated generally by the numeral 30 is provided for simultaneously maintaining the first and second valve assemblies 10 and 12 or the valve assembly 10 and the conduit 22 in an open position. The valve operating mechanism 30 also senses a connection between the first and second housing elements, 16, 16' or the housing element 16 and the conduit 22 in a manner to be described in greater detail below.

Referring in more detail to the construction of each valve fitting 10 and 12, each such fitting includes a poppet valve element 32 which is mounted for axial movement within the housing 16 between an open and closed position. The poppet valve element 32 defines a first axial fluid flow path designated generally by the dashed arrows 34 in FIGS. 3 and 9 about the perimeter 36 thereof when it is in its open position. In preferred form, the poppet valve element 32 is constructed generally in the form of an annular ring 38 having a plurality of fingers 40 projecting axially forwardly thereof as described in greater detail below. The first fluid flow path 34 generally passes about the perimeter 36 of the ring 38 into the spaces 42 defined between the fingers 40.

A first valve seat 44 is defined in the passage 18 in a size and shape to cooperate with the poppet valve element 32 when a poppet valve element 32 moves to its closed position. In this closed position, the poppet valve element 32 abuts against the preferably annular valve seat 44 as illustrated in greater detail in FIG. 4 so as to obstruct and entirely block the first fluid flow path represented by the dashed arrows 34. In preferred form, a resilient sealing member 46 is provided abut the valve seat 44 to further insure a tight seal between the poppet element 32 and the seat 44.

Each valve fitting 10 further includes a rotatable valve element 48 which in preferred form is in the form of ball valve 50. Each rotatable valve element 48 is mounted for axial and rotational movement within the housing 16 between open and closed positions. The rotatable valve element 48 includes a central bore 52 which defines in conjunction with central aperture 41 formed by the interior surface 43 of the poppet element 32 a second axial fluid flow path designated generally by the dashed arrows 54. This second axial fluid flow path 54 is defined when the rotatable valve element 48 is in its open position. Therefore, when the poppet element 32 and the rotatable valve element 44 are in their open positions, two fluid flow paths 34 and 54 are defined and permit fluid to pass regularly through the passage 18.

A second valve seat 56 is defined within the passage 18 and preferrably on the inner surface 43 of the poppet element 32. The second valve seat 56 cooperates with the rotatable valve element 48 when in its closed position to obstruct and entirely block the second fluid flow path 54 as more, clearly illustrated in FIG. 4. In this manner, when the poppet element 32 and the rotatable valve element 48 are in their closed positions, both fluid flow paths 34 and 54 are blocked, thereby preventing the flow of any fluid passage 18.

Another advantage for the above design is that the flow path through the valve fitting 10 may be divided between a straight line flow along the path 54 and a circumferential flow along the path 34. In the embodiment illustrated in the drawings, a substantial portion of the total fluid passes through the straight line flow path 54. However, the proportion between the two different flow paths may be varied depending upon the sizes of the various apertures and components thereof. As can be appreciated, specifics with respect to these variables are within the skill of the art and will not be repeated in detail herein except as may be provided below.

An interconnection mechanism generally designated by the numeral 60 is provided for interconnecting the poppet valve element 32 and the rotatable valve element 48. The interconnection assembly 60 permits simultaneous axial and rotational movement of the rotatable valve element 48 relative to the poppet element 32 when moving from its open to its closed position to thereby engage the rotatable valve element 48 against the second valve seat 56 and thereby obstruct the second fluid flow path 54. In preferred form, the interconnection mechanism 60 is in the form of a rack and pinion gear assembly described in greater detail below. In this manner, a very positive sealing can be provided.

The valve operatings further includes an additional notched recess 114 which is in the form of an annular recess at the bottom of the notch 110. The recess 114 overlaps the other side of the juncture between the housing 16, and 16', yet the thickness of the notch 114 is insufficient to permit the garter spring 108 to expand therein when the housings 16, 16', are firmly interconnected. However, upon shearing of the frangible elements 28 the initial separation of the housings 16, 16', the notch 114 expands in size commensurate with the separation of the housings 16, 16'. Immediately upon expansion of the notch 114, the garter spring 108 expands radially outwardly thereinto. Once the garter spring 108 has expanded into the enlarged notched area 114, the garter spring 108 disengages the fingers 40 and thereby allows the bias of the spring 72 to force the poppet element 32 toward its closed position against the first valve seat 44. Inasmuch as the bias from the spring 72 is placed against the piston-like poppet element 32 through direct contact on the ball valve 50, the ball valve 50 moves axially forwardly with the poppet valve element 32 until the lip 86 has cleared the central bore 52. Once the lip 86 has cleared the bore 52, the bias of the spring 72 urges the rotatable valve member 48 to move axially and rotatably along the gear mechanism 60 independent of the axial movement of the poppet valve 32. This rotational and axial movement of the ball valve 50, as described above, seats the closed face a closed rounded face thereof against the second valve seat 56 and thereby obstructs the second fluid flow path 54. It should be noted that the size and shape of the notch 114 relative to the size of the garter spring 108 should be such as to prevent any inadvertent slipping of the garter spring 108 into the notch 114 due to jarring of the assembly 14, which jarring does not amount to a load sufficient to fracture the frangible elements 28. In this manner, the valve assembly 14 may be subjected to a significant amount of stress without inadvertently and mistakenly closing the fuel line under less than preselected conditions.

The above aspect of the invention is very important. In this manner, the frangible elements may be varied for very high load conditions if desired. Furthermore, the spring element 72 may be varied for a very high bias condition to therefore increase the reliability and decrease fluid leakage by providing exceptionally rapid valve closures. However, inasmuch as the closure of the ball valve 50 is dependent entirely upon the piston action of the poppet valve 32, and inasmuch as the piston action of the poppet valve 32 is dependent upon complete expansion of the garter spring 108 into an expanded recess 114, the valve assembly 14 may not be inadvertently closed during in flight operations. As can be appreciated, aircrafts are subjected to a great deal of daily stress wherein loads to the fuel lines are incurred under less than emergency or crash conditions. If the garter spring were to inadvertently become partially recessed in the recess 114 due to shaking of the assembly 14, the valve fittings 10 and 12 would still not operate to close the fuel lines, for all of the fingers 40 must become disengaged from the garter spring 108 to permit forward movement of the poppet element 32.

Referring more particularly to FIGS. 1-8, a test fixture was created for use with the housing 16. This test fixture included a conduit 22 which is attached to the housing 16 via plates 120 and 122. Shearpin member 124 and 126 were then used to secure the conduit 22 to the plates 120, 122 to the housing 16. These pinmembers were then tightened to close the recess 114, and the valve fitting 10 then put together as described above. The illustrated valve fitting 10 was then mechanically loaded against the four screw elements 126, with a fluid flow internal pressure of 5 psi. The valve fitting assembly 10 closed upon reaching the predetermined tension, and it was determined that no leakage occured whatsoever prior to full closure of the valve fitting 10.

It can be seen from the above that the present invention incorporates a rotatable valve element with a poppet valve element having piston action to provide a high force, positive open/close valve design. The rack and pinion gear system which interconnects these two valves within one valve assembly in conjunction with a single valve retainer mechanism provides for a safe, reliable and high force positive closure. Furthermore, it should be noted that the design of the present invention permits adjustment of the flow paths through the valve fitting to proportion the flow through the poppet valve and through the central ball valve in order to accomodate different requirements of the application of the assembly. If it is desired to increase the amount of flow through the poppet valve portion of the assembly, the stroke of the poppet valve can simply be lengthened, and the size of the ball valve made smaller. This provides an exceptional degree of flexibility and end use heretofore unknown in frangible breakaway valve assemblies. Finally, the breakaway valve fitting of the present invention operates with a single spring bias member which functions to rotate the rotatable valve member in the same direction as movement of the poppet valve element, thereby adding to the high force, positive closure aspect of the invention.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

I claim:

1. A breakaway valve fitting comprising:
   housing means defining a passage therein;
   breakaway means connecting said housing means to conduit means;
   poppet valve means mounted for axial movement within said housing means between open and closed positions, said poppet valve means defining a first axial fluid flow path about the perimeter thereof when in said open position;
   means defining a first valve seat in said passage and cooperating with said poppet valve means when in said closed position to obstruct said first fluid flow path;
   a ball valve member mounted for axial and rotational movement within said housing means between open and closed positions, said ball valve member including a central bore which defines in conjunction with said poppet valve means a second axial fluid flow path when said ball valve member is in said open position;
   means defining a second valve seat in said passage and cooperating with said ball valve member in said closed position to obstruct said second fluid flow path;
   means interconnecting said poppet valve means and said ball valve member for permitting simultaneous axial and rotational movement of said ball valve member relative to said poppet valve means when moving from said open to said closed positions to thereby engage said ball valve member against said second valve seat and obstruct said second fluid flow path;
   expandable circumferential means for releasably retaining said ball valve member in said open position;
   compression spring means for biasing said poppet valve means and said ball valve member, respectively, toward said first and second valve seats; and
   valve operating means for sensing the connection of said housing means to said conduit means and controlling the operation of said poppet valve means and said expandable circumferential retaining means by permitting said poppet valve means to axially move to said closed position and said expandable circumferential retaining means to release said ball valve member to obstruct said fluid flow paths upon activation of said breakaway means.

2. The valve fitting as described in claim 1, wherein said breakaway means comprises a coupling assembly including at least one frangible element, said element being activated by fracturing of said at least one frangible element.

3. The valve fitting as described in claim 2, wherein at least one frangible element comprises a plurality of shear pin members interconnecting said housing means and conduit means and being substantially evenly spaced about said coupling assembly.

4. The valve fitting as described in claim 1, wherein said poppet valve means comprises an annular poppet element, said first axial fluid flow path being defined, in part between the outer annular surface of said poppet element and said first valve seat.

5. The valve fitting as described in claim 4, wherein said annular poppet element includes a plurality of annularly spaced fingers projecting forward and spaced from the first valve seat, the first axial fluid flow path further being defined by the areas between said fingers.

6. The valve fitting as described in claim 4, wherein said annular poppet element comprises a ring member having an inner annular surface which defines said second axial fluid flow path in conjunction with said ball valve member central bore.

7. The valve fitting as described in claim 1, wherein said valve interconnection means comprises an intermeshing gear assembly.

8. The valve fitting as described in claim 7, wherein said intermeshing gear assembly comprises intermeshing rack and pinion gear members disposed on said poppet valve means and said ball valve member to provide both axial and rotational movement of said ball valve member relative to said poppet valve means following release of said ball valve member by said expandable circumferential retaining means, said gear members affording firm and positive engagement of said ball valve member with said second valve seat to obstruct said second fluid flow path.

9. The valve fitting as described in claim 1, wherein said valve operating means comprises resilient means releasably maintaining said poppet valve means in its open position and adapted to respond to said breakaway means.

10. The valve fitting as described in claim 9, wherein said resilient means comprises a radially expandable, annular spring member engaged between said housing means and said poppet valve means and adapted for radially outward movement upon activation of said breakaway means to disengage said poppet valve means and permit axial movement thereof to its closed position.

11. The valve fitting as described in claim 1, wherein said expandable circumferential retaining means is adapted to automatically release said ball valve member upon partial axial movement of said poppet valve means from its open position toward its closed position.

12. A frangible valve assembly comprising:
   first and second housing means;
   coupling means for interconnecting said housing means and including frangible means responsive to relative loading between said first and second housing means; and
   first and second valve means mounted, respectively, within said first and second housing means for movement between open and closed positions;
   valve operating means for simultaneously maintaining said first and second valve means in said open position and sensing the connection between said first and second housing means;
   each said valve means comprising means defining a first valve seat, poppet means axially spaced from said valve seat when said valve means is in said open position, said poppet means defining a first axial fluid flow path through the center thereof and a second axial fluid flow path about the perimeter thereof when said valve means is in said open position, said poppet means being adapted for axial movement against said first valve seat to close said second fluid flow path when said valve means is in said closed position, means defining a second valve seat disposed on said poppet means, ball sealing means mounted for axial and rotational movement within said housing means and including a central bore defining a third axial fluid flow path communicating with said first flow path when said valve means is in an open position, means interconnecting said poppet means and said ball sealing means for permitting simultaneous rotational and axial movement of said ball sealing means relative to said poppet means to engage said ball sealing means against said second valve seat and discommunicate said first and third fluid flow paths when said valve means is in said closed position, expandable circumferential ball retaining means for releasably maintaining said ball sealing means in an open position, and compression spring means for biasing said poppet means and ball sealing means, respectively, toward said first and second valve seat means.

13. The frangible valve assembly as described in claim 12, wherein said frangible means comprises a plurality of shear pin members adapted to fracture upon being subjected to a variable predetermined load.

14. The valve assembly as described in claim 13, wherein said shear pin members are spaced about said coupling assembly.

15. The frangible valve assembly as described in claim 12, wherein said valve operating means is adapted to permit substantially simultaneous movement of both said first and second valve means from said open positions to said closed positions.

16. The frangible valve assembly as described in claim 15, wherein said valve operating means comprises resilient spring means adapted for engagement with the poppet means of both said first and second valve means and releasably maintaining both said poppet means in their said open positions.

17. The frangible valve assembly as described in claim 16, wherein each said poppet means includes a plurality of annularly spaced fingers projecting axially toward the respective first valve seats of said first and second valve means, the fingers of one said poppet means being arranged to intermesh with the fingers of the other said poppet means when said first and second valve means are in their closed positions, said resilient spring means engaging all said fingers of both said poppet means when said first and second valve means are in their open positions.

18. The frangible valve assembly as described in claim 17, wherein said coupling means defines an annular space for receiving said resilient spring means upon fracturing of said frangible means and to thereby disengage said spring means from said poppet means.

19. The frangible valve assembly as described in claim 12, wherein said interconnection means comprises a rack and pinion gear assembly interconnecting said poppet means and said ball sealing means in each said first and second valve means.

20. A self-closing breakaway coupling assembly comprising a first valve housing having a first rotatable valve means mounted therein for axial and rotational movement between open and closed positions, said first valve housing further including first piston means having a central aperture and mounted for axial movement within said first housing between open and closed positions, said first rotatable valve means having a central bore aligned with said first piston means central aperture when said first rotatable valve means and said first piston means are each disposed in said open positions, said first rotatable valve means being compression spring biased to rotate to said closed position when said first piston means is axially moved to said closed position wherein the central bore and central aperture of said first rotatable valve means and said first piston means, respectively, are misaligned to block the passage of fluid through said first valve housing;

a second valve housing having a second rotatable valve means mounted therein for axial and rotational movement between open and closed positions, said second valve housing further including second piston means having a central aperture and mounted for axial movement within said second housing between open and closed positions, said second rotatable valve means having a central bore aligned with said second piston means central aperture when said second rotatable valve means and said second piston means are each disposed in said open positions, said second rotatable valve means being compression spring biased to rotate to said closed position when said second piston means is axially moved to said closed position wherein the central bore and central aperture of said second rotatable valve means and said second piston means, respectively, are misaligned to block the passage of fluid through said second valve housing;

coupling means for interconnecting said first and second valve housings and including breakaway means for permitting separation of said first and second valve housings; and valve operating means for sensing said breakaway means and controlling by expandable circumferential retaining means the movement of said first and second piston means from said open to said closed positions to obstruct fluid flow through said assembly upon activation of said breakaway means.

21. The breakaway coupling assembly as described in claim 20, wherein said first and second rotatable valve means central bores and said first and second piston means central apertures are all in common alignment when both said valve means and both said piston means are in their respective open positions.

22. The breakaway coupling assembly as described in claim 20, wherein the axial movement of said first and second piston means operates to control the movement of said first and second rotatable valve means, said valve operating means being adapted to permit substantially simultaneous axial movement of said first and second piston means to their said closed positions.

23. The breakaway coupling assembly as described in claim 20, wherein said first and second rotatable valve means are connected, respectively, to said first and second piston means by gear assembly means for permitting axial and rotational movement of said first and second rotatable valve means relative, respectively, to said first and second piston means.

24. The breakaway coupling assembly as described in claim 20, when each said valve housing includes a first valve seat engageable with said respective piston means and a second valve seat engageable with said respective rotatable valve means, the engagement of both said valve seats in one said housing effecting the blockage of fluid passage through that said housing.

* * * * *